US009098970B2

(12) United States Patent
Antkowiak et al.

(10) Patent No.: US 9,098,970 B2
(45) Date of Patent: Aug. 4, 2015

(54) WAGERING GAME MACHINE HIBERNATION

(75) Inventors: Ryan Antkowiak, Chicago, IL (US); Jesse Garvey, Chicago, IL (US); Damon E. Gura, Chicago, IL (US); Vernon W. Hamlin, Lisle, IL (US); Budyanto Himawan, Chicago, IL (US); Mahesh Lakshmanaperumal, Des Plaines, IL (US); Laurie Lasseter, Wood Ridge, IL (US); Robert A. McPeak, Henderson, NV (US); Jorge Luis Shimabukuro, Las Vegas, NV (US); Craig J. Sylla, Round Lake, IL (US); Anussorn Andy Veradej, Las Vegas, NV (US); Jun Wang, Henderson, NV (US)

(73) Assignee: WMS Gaming Inc., Waukegan, IL (US)

( * ) Notice: Subject to any disclaimer, the term of this patent is extended or adjusted under 35 U.S.C. 154(b) by 371 days.

(21) Appl. No.: 13/523,986

(22) Filed: Jun. 15, 2012

(65) Prior Publication Data
US 2012/0322537 A1  Dec. 20, 2012

Related U.S. Application Data

(60) Provisional application No. 61/498,179, filed on Jun. 17, 2011.

(51) Int. Cl.
*G07F 17/32* (2006.01)
*G06F 1/32* (2006.01)
*G06F 9/44* (2006.01)

(52) U.S. Cl.
CPC .......... *G07F 17/3225* (2013.01); *G06F 9/4418* (2013.01); *G07F 17/3241* (2013.01)

(58) Field of Classification Search
CPC ..... G06F 9/4418; G07F 17/3241; G07F 17/3225
USPC ........................................... 463/24
See application file for complete search history.

(56) References Cited

U.S. PATENT DOCUMENTS

| 5,560,023 | A  | * | 9/1996  | Crump et al. ................. 713/323 |
|-----------|----|---|---------|---------------------------------------|
| 6,149,522 | A  |   | 11/2000 | Alcorn et al. .................... 463/29 |
| 7,757,060 | B2 |   | 7/2010  | Montero et al. ............. 711/165   |
| 8,029,365 | B2 |   | 10/2011 | Burke et al. .................... 463/42 |
| 8,043,160 | B2 |   | 10/2011 | Dasgupta ........................ 463/42 |
| 8,075,395 | B2 |   | 12/2011 | Sylla .............................. 463/29 |
| 8,280,816 | B2 |   | 10/2012 | Dasgupta ........................ 705/56 |
| 2003/0195033 | A1 | | 10/2003 | Gazdic et al. .................... 463/20 |
| 2003/0203756 | A1 | | 10/2003 | Jackson .......................... 463/42 |
| 2006/0085630 | A1 | * | 4/2006 | Challener et al. ................ 713/2 |

(Continued)

FOREIGN PATENT DOCUMENTS

WO  WO2008/108916 A1  9/2008  ............. G07F 17/32

*Primary Examiner* — Paul Yanchus, III
*Assistant Examiner* — Joshua Neveln
(74) *Attorney, Agent, or Firm* — Nixon Peabody LLP

(57) ABSTRACT

Apparatus, systems, and methods may operate to receive operational power from a primary power supply at a processor housed within a wagering game machine, where the processor is operable to present a wagering game. Further activities may include determining that the wagering game machine is currently in a hibernation state, authenticating at least one hibernation file, and resuming operation of the wagering game machine to a base operation state defined by the at least one hibernation file. Additional apparatus, systems, and methods are disclosed.

30 Claims, 5 Drawing Sheets

(56) References Cited

U.S. PATENT DOCUMENTS

| | | | |
|---|---|---|---|
| 2006/0264256 A1 | 11/2006 | Gagner et al. | 463/20 |
| 2007/0112899 A1* | 5/2007 | Edwards et al. | 707/205 |
| 2007/0259709 A1* | 11/2007 | Kelly et al. | 463/20 |
| 2008/0140816 A1* | 6/2008 | Burokas et al. | 709/222 |
| 2009/0138133 A1* | 5/2009 | Buchholz et al. | 700/295 |
| 2009/0221359 A1* | 9/2009 | Adiraju et al. | 463/25 |
| 2010/0062833 A1 | 3/2010 | Mattice et al. | 463/24 |
| 2010/0255902 A1 | 10/2010 | Goldstein et al. | 463/29 |
| 2010/0306770 A1 | 12/2010 | Frank | 718/1 |

* cited by examiner

WAGERING GAME MACHINE HIBERNATION

RELATED APPLICATION

This patent application claims the priority benefit under 35 U.S.C. 119(e) of U.S. Provisional Patent Application Ser. No. 61/498,179, filed Jun. 17, 2011, and entitled "WAGERING GAME MACHINE HIBERNATION", which is incorporated herein by reference in its entirety.

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2011-2012 WMS Gaming, Inc.

BACKGROUND

Wagering game machine manufacturers and operators continually strive to provide new and entertaining games. One way of increasing the entertainment value associated with casino-style wagering games (e.g., video slots, video poker, video black jack, and the like) includes offering a variety of base games and bonus events. However, despite the variety offered, players may still tend to lose interest. Some circumstances can exacerbate this situation.

For example, due to repairs and other routine operations, the power supplied to wagering game machines is cycled, resulting in a lengthy boot process that occurs before the machine is fully operational. The longer the process, the less likely players are to use the machine. In short, the boot process adds a noticeable delay to machine operations, and players may be motivated to look elsewhere for entertainment when their patience is exhausted. This can result in a loss of revenue.

BRIEF DESCRIPTION OF THE FIGURES

Embodiments of the invention are illustrated by way of example and not limitation in the Figures of the accompanying drawings, in which.

DETAILED DESCRIPTION

Example Operating Environment

Example Wagering Game Machine Architecture

Figure 1:
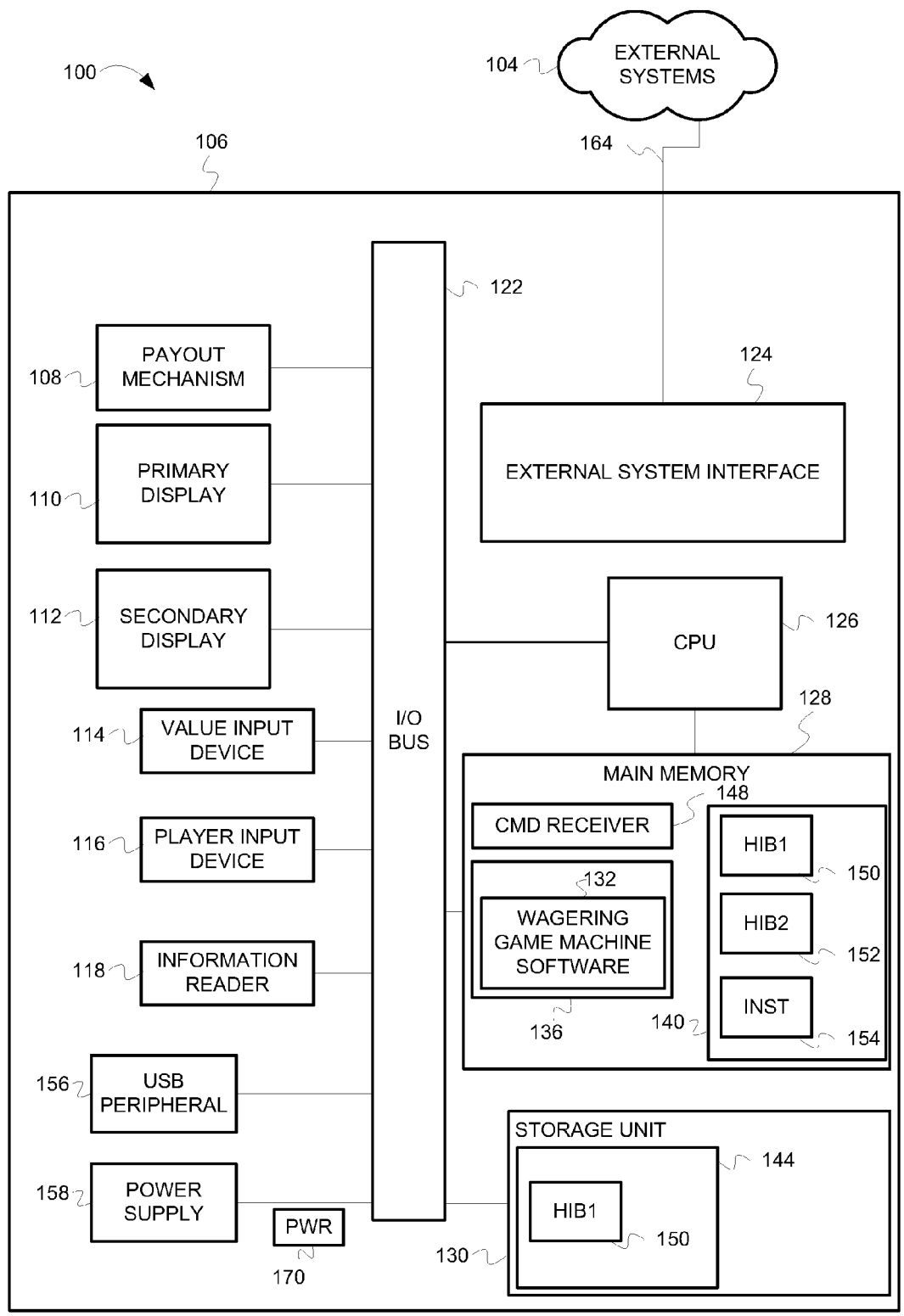
FIG. 1 is a block diagram illustrating a wagering game machine architecture, according to various embodiments.

Within a wagering game machine, the cold boot process (i.e., the process of loading software and initializing hardware components after power is first applied, to bring the machine to a state where wagers can be accepted for game play) can take many minutes. The inventors have discovered that generating hibernation files, and using them for machine recovery as part of power-off, power-on cyclic operation can significantly reduce the time used to bring the machine to a fully-operational state. This occurs while the integrity of the entire machine is verified, so that security is maintained. In short, startup delays due to routine maintenance and other power cycle events can be significantly reduced when hibernation files are created and used as described herein.

In some embodiments, the hibernation functionality built into a Microsoft® Windows® embedded operating system (OS) can be used. In some embodiments, the Linux® OS "suspend to disk" and "hibernate to disk" operations can be used.

Wagering game machines may comprise a number of hardware and software components. Software components may include images stored in memory. For example, in some machines, an image of memory content in the machine can be saved with respect to a particular point in time. This permits the machine operational state to be preserved using a snapshot of memory content. The snapshot may be associated with a time stamp under some OS protocols. The snapshot image may be saved in a storage medium as a hibernation file which, when recalled to machine memory and the instructions forming a portion thereof are executed, results in the wagering game machine resuming operation at the same point at which the snapshot was taken. In this way, operations can be resumed without, for example, reloading and authenticating the OS and driver files from scratch. Boot time can thus be considerably reduced.

In the process of booting a wagering game machine from a power-off state, the basic input-output system (BIOS) executes a power on self-test (POST) routine after operational power is applied, Extended operations may involve using a public key to authenticate the BIOS itself. The BIOS may thus be signed by a manufacturer's private key.

Once the BIOS is authenticated, execution often proceeds to authenticate the boot media, which might be stored in a flash memory. The boot media may include a boot partition that is made up of a boot loader and an OS. A master boot record that governs partitions, including a file signature table and a partition signature table, may be accessed. After the boot media is authenticated, authentication of the OS may be initiated.

Once the OS is authenticated, the machine loads the OS to begin its execution. Software and hardware drivers are authenticated and loaded. Hardware components are then initialized.

At this point, an operator can configure the machine as desired, so that the machine is brought into a fully-operational state. The operator might, for example, load gaming applications (e.g., from a game services partition, which includes drivers for applications as well, or from separate media) to begin their authentication and execution on the machine.

In various embodiments, the inventors have discovered that the use of authenticated hibernation files permit rapidly validating the machine memory content, as well as the presence of installed components. Resuming execution using this type of hibernation file thus provides a trusted operational environment with a significantly reduced boot process time. Therefore, many embodiments can be realized.

For example, a snapshot of the machine during operation can be taken by the manufacturer, at the factory. This might occur after the OS and drivers for default devices (e.g., hardware components such as a memory controller, graphics controller, universal serial bus (USB) controller, backplane, processor (CPU), and network interface), along with default gaming services, are loaded. In some embodiments, this operational state is known as the "base operation state".

Business logic and rule sets may be built around the selection of multiple hibernation files. Thus, some embodiments include a smart hibernation file selection mechanism, based on hardware and/or games detected as being in use within a given machine. For example, memory content associated with a wagering game may be accessed to determine the hardware and/or software configuration of a particular wagering game machine. This information can be used to select one of a number of hibernation files for use.

In some embodiments, a hardware or software indicator can be accessed to determine whether default hardware has changed as part of a power cycle operation. The state of the indicator can be used to select an appropriate hibernation file to use for resuming operations. For example, if new hardware has been added, the machine may resume operating with a previously-authenticated base operation state configuration (e.g., as part of a partition authentication), after which only the new hardware devices and associated drivers are authenticated and loaded before resuming regular gaming functionality. This method of operation can significantly reduce the time used in the boot process when new hardware is added, or used to replace old hardware.

In some embodiments, a wagering game machine may operate so that all machine power-on operations constitute resume operations, instead of cold boot operations. Thus, instead of authenticating and loading the OS and drivers from scratch, for example, the hibernation file is authenticated, and operation is resumed from the hibernation state to the base operation state.

In some embodiments, a wagering game machine operates such that after power is applied, the hibernation file is discovered as part of initial authentication operations. Thus, the hibernation file is authenticated, and operation is resumed after execution enters the authentication partition, where an administration screen, such as an operator's configuration console, is displayed. The administration screen might include a menu that permits selection of a particular hibernation configuration file. After that file is authenticated, operation is resumed to a second base state (e.g., accepting wagers to begin execution of a wagering game).

In some embodiments, a wagering game machine operates to resume operation at the point where a base OS has been authenticated and loaded. The machine may then operate to display a selection of authenticated hibernation files (e.g., corresponding to a selection of pre-configured wagering games), any one of which can be selected to resume regular gaming operations.

Thus, in some embodiments, a wagering game machine may offer multiple hibernation files, perhaps corresponding to multiple base operation state configurations and/or multiple game configurations. When the machine operates to always resume operations using a hibernation file, various embodiments may execute the POST to arrive at a persistent operational state.

In some cases, a menu is presented to the operator so that the operator can choose the base operation state configuration where operations are to be resumed. In summary, hibernation files can be used to augment, simplify, or speed up a variety of routine operations, some of which are listing in the following paragraphs.

In some embodiments, when the occurrence of a power brown-out or black-out event is sensed, a hibernation file is created and saved in non-volatile memory. Backup power may be supplied as needed, to provide sufficient time to create the file. The hibernation file created in this fashion might be transmitted by the wagering game machine to a remote repository maintained within or without a casino for later recovery.

In some embodiments, snapshots are taken on a periodic basis, such as every five minutes, and the latest snapshot is used as the hibernation file whenever the next boot process is encountered. Individual games may be configured to indicate that a snapshot is to be taken, so that hibernate files are created at selected points during game play. Thus, hibernation file snapshots can be used as a periodic validation mechanism.

Hibernation file images may be communicated from a first wagering game machine to a second wagering game machine so that operations can be quickly resumed at the second machine, when operational failure is sensed within the first machine. These images may also be sent to a server, or received from a server to enhance recoverability, so that hibernation files can be shared and/or distributed.

In some embodiments, large awards (e.g., a progressive win) will provide an indication that the wagering game machine(s) involved are to take hibernation file snapshots for automated validation and verification, as well as authentication and forensics.

Diskless wagering game machines can be authenticated using an associated hibernation file. Hibernation files can also be used to replace the operation of swapping out a logic box—functionality can simply be restored by accessing a hibernation file. A hibernation file can be used to restore operations to a default memory state in stationary or portable devices. When a fault is detected within a wagering game machine, a master default hibernation file can be downloaded, to provide operational resumption at a known base state. These and other embodiments may be realized, and will now be described in further detail.

FIG. 1 is a block diagram illustrating a wagering game machine architecture 100, according to various embodiments of the invention. As shown in FIG. 1, an apparatus 106, such as a wagering game machine, includes a central processing unit (CPU) 126 coupled to main memory 128, which in turn may include media images 132, such as wagering game machine software. The CPU 126 may include multiple processing cores, memory interface circuitry, a USB (universal serial bus) peripheral controller, and other elements.

The main memory 128 may be subdivided into portions, such as portions devoted to volatile memory 136 and non-volatile memory 140, and combinations thereof. The non-volatile memory 140 may comprise, in whole or in part, flash memory, phase-change memory, and read-only memory, among others. In many embodiments, the media images 132 include instructions which, when executed, can be used to present wagering games upon which monetary value may be wagered. Such games include video poker, video black jack, video slots, video lottery, etc.

The media images 132, including wagering game machine software, may alternatively, or in addition, be stored in a mass storage unit 130, which may comprise one or more mass storage devices 144, including a disk drive, such as a hard disk drive or an optical disc drive (e.g., a compact disc, read-only memory disc drive), a flash memory drive, or some combination of these. One or more hibernation files 150, 152 may be stored in the memory 128 (in either or both memories 136, 140), the storage unit 130, or elsewhere (e.g., on a wagering game server). The signatures corresponding to the hibernation files 150, 152 may be stored and/or downloaded with the files themselves, or separately calculated and stored after downloading/storage is complete. Any information that is stored in the main memory 128 may be stored in the storage unit 130, and vice versa.

The CPU 126 may also be connected to an input/output (I/O) bus 122, which facilitates communication between the components of the apparatus 106. The I/O bus 122 may be connected to a payout mechanism 108, a primary display 110, a secondary display 112, a value input device 114, a player input device 116, an information reader 118, the storage unit 130, and a power supply 158. The power supply 158 may be used to supply operational power 170 to any of the components of the apparatus 106. The bus 122 may include one or more portions, any one or more of which may comprise a USB. Thus, any of the components coupled to the bus 122 may comprise USB peripherals 156.

The player input device 116 can include the value input device 114 to the extent the player input device 116 is used to place wagers. The I/O bus 122 may be connected to an external system interface 124, which can be coupled to external systems 104 (e.g., wired and wireless wagering game networks). The external system interface 124 may comprise a network interface card and/or a wireless transceiver that enables the apparatus 106 to communicate with wired and/or wireless networks 164 respectively. Thus, the apparatus 106 may comprise a portable wagering game machine having a wireless transceiver (e.g., see FIG. 5).

In one embodiment, the apparatus 106 can include additional peripheral devices and/or more than one of each component shown in FIG. 1. For example, in one embodiment, the apparatus 106 can include multiple external system interfaces 124 and multiple processors 126. In one embodiment, any of the components can be integrated or subdivided. Additionally, in one embodiment, the components of the apparatus 106 can be interconnected according to any suitable interconnection architecture (e.g., directly connected, serially connected, star network, hypercube, etc.).

In one embodiment, any of the components of the apparatus 106 can include hardware, firmware, and/or software for performing the operations described herein. Thus, some embodiments may include an article of manufacture comprising a non-transitory machine readable medium having instructions stored thereon, wherein the instructions, when executed by one or more processors, result in performing any of the methods described herein. Machine-readable media include any mechanism that provides (e.g., stores) information in a form readable by a machine (e.g., a wagering game machine, computer, etc.). For example, tangible machine-readable media includes read only memory (ROM), random access memory (RAM), magnetic disk storage media, optical storage media, flash memory drives, etc. Thus, many embodiments may be realized.

For example, an apparatus 106, perhaps forming part of a wagering game machine, may comprise one or more processors 126 and media images 132, including software programs which, when executed by the processor(s) 126, result in presenting a wagering game upon which monetary value may be wagered. The apparatus 106 may operate to create, store, receive, and execute hibernation files 150, 152. Thus, various embodiments may be realized.

For example, an apparatus 106 may comprise one or more processors 126 operable to present a wagering game upon which monetary value may be wagered. The apparatus 106 may further comprise a plurality of hardware components (e.g., any one or more of the aforementioned payout mechanism 108, displays 110, 112, value input device 114, player input device 116, information reader 118, storage unit 130, USB peripherals 156, and power supplies 158, among others). The hardware components may comprise any component used in the apparatus 106 that can be associated with a signature, including a globally unique identifier (GUID) assigned by the manufacturer.

In many embodiments, the apparatus 106 comprises a circuit 148 to receive a command which operates to initiate creation of one or more hibernation files 150, 152. Thus, additional embodiments may be realized.

For example, an apparatus 106, such as a wagering game machine, may comprise at least one processor 126 operable to present a wagering game upon which monetary value may be wagered, a non-volatile memory 140 storing instructions 154, and a power supply 158. The power supply 158 may be used to provide operational power 170, so that one or more processors 126 operate, upon receiving the operational power 170, to execute the instructions 154 to determine that when the wagering game machine is in a hibernation state, operation of the wagering game machine is to resume at a base operation state defined by at least one hibernation file 150 when authentication of the at least one hibernation file 150 is successful.

The apparatus 106 may further comprise a circuit 148 to receive a command (e.g., to resume operations using a hibernation file, or to create a hibernation file immediately, etc.). The commands received may include commands provided by a wagering game server, via a network, or by an AOM (administration, operation, maintenance) device or server. Thus, the circuit 148 may comprise a network interface (similar to or identical to the interface 124) to receive the command from a server. In some cases, the command received may cause the apparatus 106 to create, store, transmit, and/or download one or more hibernation files 150, 152.

The command may be received in response to a variety of events. These include activation of a hardware switch, a value input device, a player input device, a touch screen display, or an information reader, among others.

In some embodiments, the apparatus 106 may comprise one or more displays 110, 112. The displays 110, 112 may be used to display an operator's wagering game configuration menu as part of the base operation state of the apparatus 106.

Figure 2:
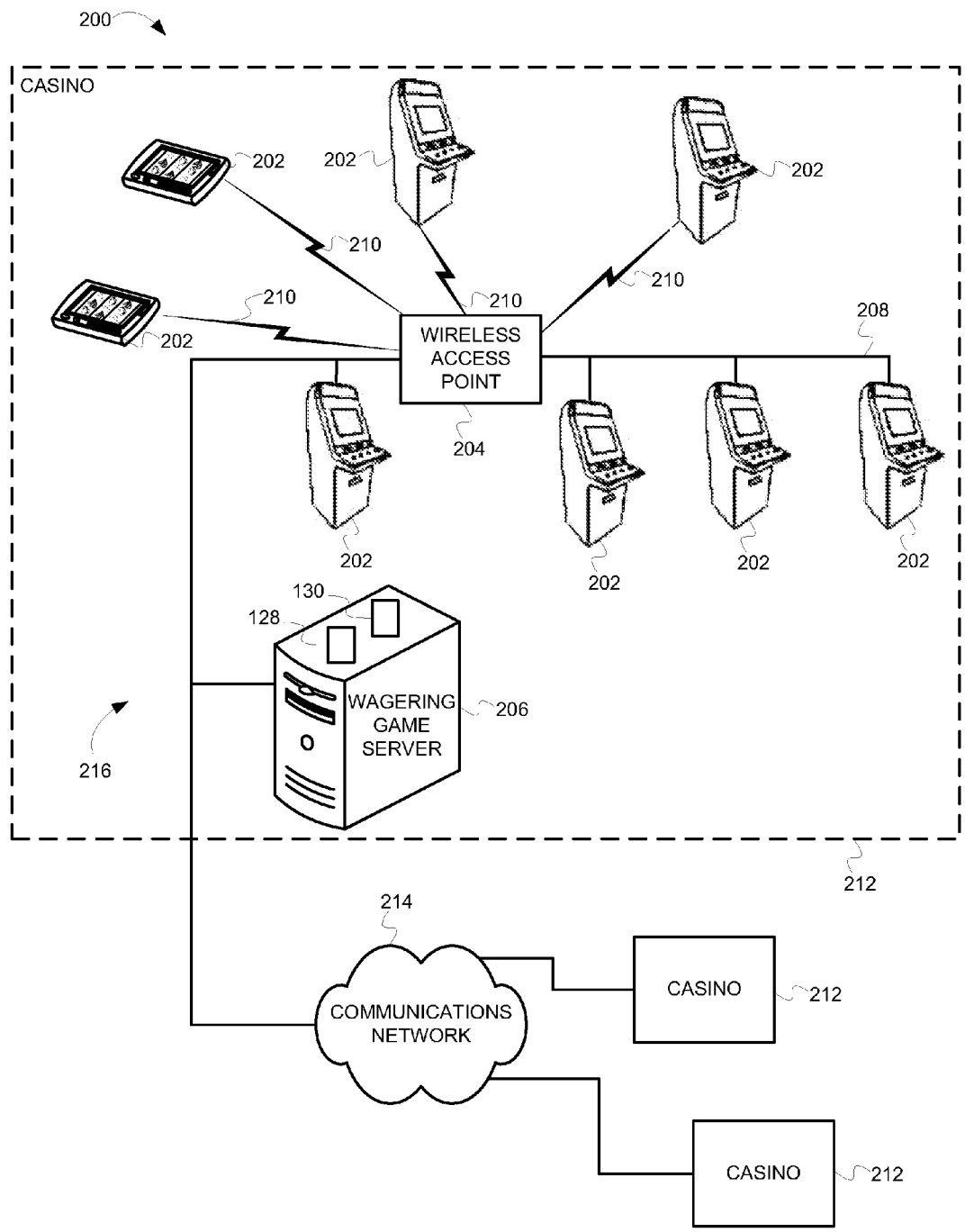
FIG. 2 is a block diagram illustrating a wagering game network, according to various embodiments.

While FIG. 1 describes several embodiments of a wagering game machine architecture 100, FIG. 2 shows how a plurality of wagering game machines can be connected in a wagering game network.

Example Wagering Game Network

FIG. 2 is a block diagram illustrating a wagering game network 200, according to various embodiments of the invention. As shown in FIG. 2, the wagering game network 200 includes a plurality of casinos 212 connected to a communications network 214.

Each of the plurality of casinos 212 includes a local area network 216, which may include wireless access points 204, wagering game machines 202, and a wagering game server 206 that can serve wagering games over the local area network 216. As such, the local area network 216 includes wireless communication links 210 and wired communication links 208. The wired and wireless communication links 208, 210 can employ any suitable connection technology, such as Bluetooth, I.E.E.E. 802.11, Ethernet, public switched telephone networks, SONET, etc. In one embodiment, the wagering game server 206 can serve wagering games and/or distribute content to wagering game machines and other devices located in other casinos 212 or at other locations on the communications network 214.

The wagering game machines 202 and wagering game server 206 can include hardware and machine-readable media including instructions for performing any of the operations described herein. The wagering game machines 202 may be similar to or identical to the apparatus 106 shown in FIG. 1.

The wagering game machines 202 described herein can take any suitable form, such as floor standing models, handheld mobile units, table top models, workstation-type console models, etc. Further, the wagering game machines 202 can be primarily dedicated for use in conducting wagering games, or can include non-dedicated devices, such as mobile phones, personal digital assistants, personal computers, etc. In one embodiment, the wagering game network 200 can include other network devices, such as accounting servers, wide area progressive servers, and player tracking servers.

In various embodiments, wagering game machines 202 and wagering game servers 206 work together such that a wagering game machine 202 may be operated as a thin, thick, or intermediate client. For example, one or more elements of game play may be controlled by the wagering game machine 202 (client) or the wagering game server 206 (server). Game play elements may include executable game code, lookup tables, configuration files, game outcome, audio or visual representations of the game, game assets or the like. In a thin-client example, the wagering game server 206 may perform functions such as determining game outcome or managing assets, while the wagering game machine 202 may be used merely to present the graphical representation of such outcome or asset modification to the user (e.g., player). In a thick-client example, game outcome may be determined locally (e.g., at the wagering game machine 202) and then communicated to the wagering game server 206 for recording or managing a player's account. In some embodiments, the wagering game machines 202 are operated as virtual machines, hosted on a server 206.

Similarly, functionality not directly related to game play may be controlled by the wagering game machine 202 (client) or the wagering game server 206 (server) in some embodiments. For example, commands and events that affect the creation and use of hibernation files may be managed centrally (e.g., by the wagering game server 206) or locally (e.g., by the wagering game machine 202). Other functionality not directly related to game play may include advertising presentation, software or firmware updates, system quality or security checks, etc.

Thus, other embodiments may be realized. For example, a wagering game system may comprise one or more wagering game machines 202, each of which may be configured to operate in a manner similar to or identical to the apparatus 106 of FIG. 1. The system may include one or more wagering game servers 206 communicatively coupled to the wagering game machines 202, perhaps via networks 208, 210. Referring now to FIGS. 1 and 2, it can be seen that the server 206 can be used to store all of the images, files, and/or signatures that are used by the machines 202. Therefore, in some embodiments, the server 206 may be used to store independent copies of any of the images, files, signatures, or tables contained in the main memory 128 and/or mass storage unit 130 of one or more of the wagering game machines 202.

Example Operations

Figure 3:
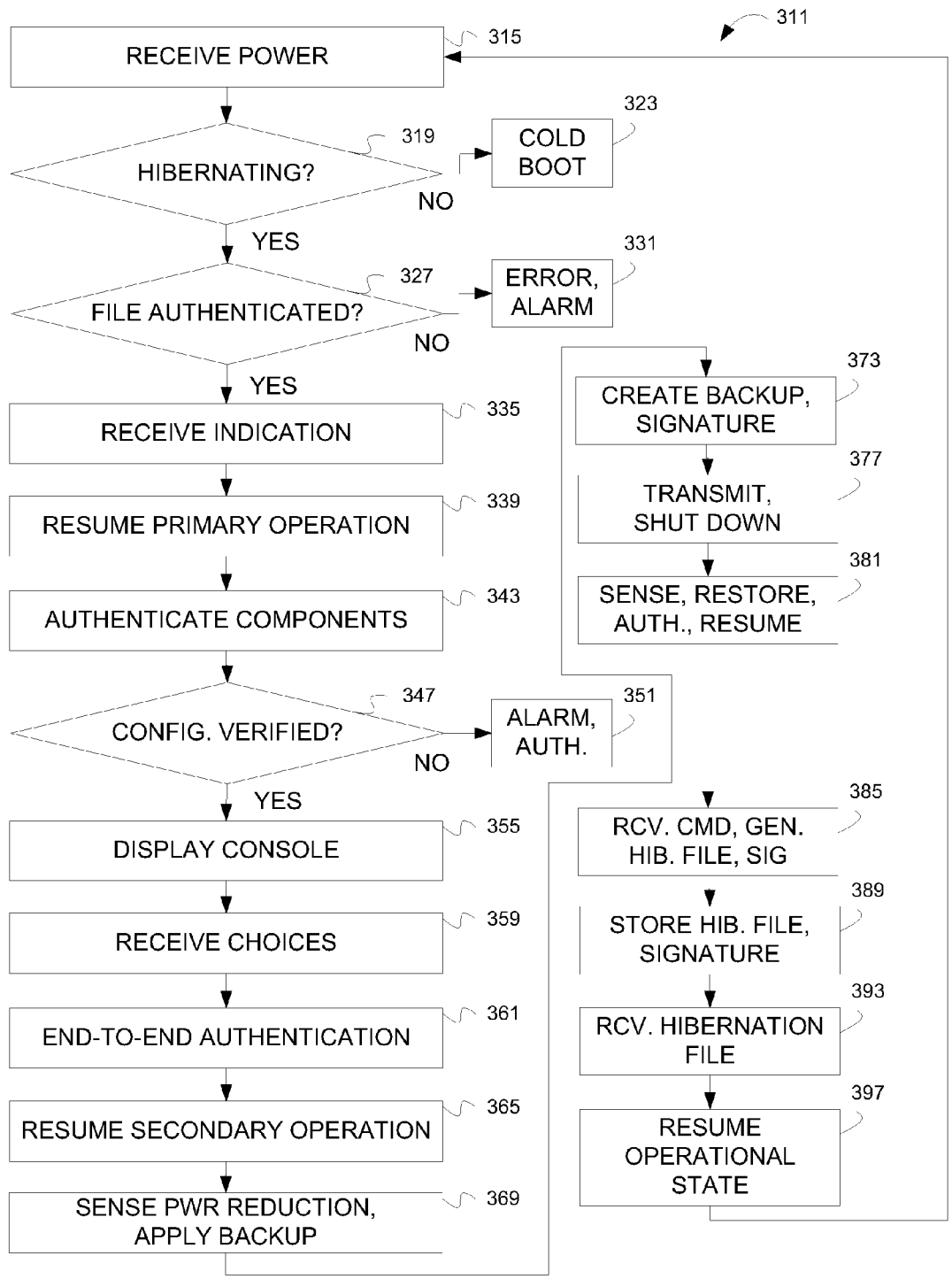
FIG. 3 is a flow chart illustrating methods according to various embodiments.

FIG. 3 is a flow chart illustrating methods 311 according to various embodiments. Generally, these methods 311 describe various details with respect to resuming operation of a wagering game machine to a defined base state using an authenticated hibernation file.

For the purposes of this document, a "hibernation file" is defined as a file that is used to capture the content of volatile memory (e.g., RAM) in non-volatile memory (e.g., flash memory or hard disk) while a wagering game machine is operating. As part of invoking hibernation activity, a hibernation file can be created and stored before power is removed from the operating wagering game machine. When power is again supplied to the machine, the content stored in the hibernation file, in non-volatile memory, can be retrieved and restored to volatile memory. At this point, the operating state of the machine is also restored to what it was just prior to the point of invoking the hibernation activity, and machine operations can be resumed.

A signature may be pre-calculated and stored along with or inside its associated hibernation file, or determined at runtime. Authenticity may be added to a signature using an authentication method, such as the method documented by Digital Signature Standard (DSS) FIPS (Federal Information Processing Standards) PUB 186-3, Information Technology Laboratory, National Institute of Standards and Technology, June 2009. Thus, many embodiments may be realized.

For example, a method 311 of operating a wagering game machine may begin at block 315 with receiving operational power from a primary power supply (e.g., the regular 120 VAC wall-powered supply) at a processor housed within a wagering game machine, the processor operable to present one or more wagering games. The method 311 may continue on to block 319 to determining whether the wagering game machine is currently in a hibernation state. For example, this determination can be made by detecting existence, by the processor, of one or more hibernation files stored in the wagering game machine.

If it is determined that the machine is not in a hibernation state at block 319, the method 311 may continue on to enter a regular cold boot process at block 323. Otherwise, the method 311 may continue on to block 327, with authenticating one or more hibernation files.

If it is determined that authentication of the hibernation file(s) is unsuccessful at block 327, then the method 311 may continue on to present an error message and/or alarm at block 331. Otherwise, the method 311 may continue on to block 335, with receiving an indication corresponding to the selection of a particular hibernation file. In some cases, no selection is necessary, because only one hibernation file exists.

Each hibernation file accessible to a wagering game machine may correspond to one of multiple selectable base operation state configurations of the machine. Thus, the activity at block 335 may comprise receiving an indication that a particular one of the selectable base operation state configurations is to be selected for resuming operation of the wagering gaming machine. The BIOS or some other pre-OS entity may be used to select a particular hibernation file that is used to resume operations, based on available memory size, memory type, processor type, wagering game machine type, peripherals present in the machine, and other hardware or software characteristics. In some embodiments, hibernation files are matched to sets of hardware configuration characteristics that are stored along with the instructions included in the wagering game machine (e.g., in conjunction with the instructions 154 of FIG. 1). In this way, the hardware configuration of a particular wagering game machine can be used to select an appropriate hibernation file for resuming operations.

In another example, each hibernation file accessible to a wagering game machine may correspond to one of multiple selectable loaded gaming application configurations of the machine. Thus, the activity at block 335 may comprise receiving an indication that a particular one of the selectable loaded gaming application configurations is to be selected for resuming operation of the wagering gaming machine. Combinations of base configurations and loaded gaming applications may also be indicated, and selected.

The method 311 may continue on to block 339, with resuming operation of the wagering game machine to a base operation state defined by one or more hibernation files. The base operation state may comprise presentation of an operator's wagering game machine configuration menu in some cases. The base operation state may also comprise presentation of the wagering game.

In many embodiments, explicitly authenticating a hibernation file results in implicit BIOS authentication when the BIOS was explicitly authenticated prior to generating the hibernation file. In some embodiments, the base operation state comprises a state wherein the BIOS is loaded, but not yet executing, wherein the BIOS is used to enable loading an OS. In some embodiments, the base operation state comprises a state wherein the OS is loaded, but not yet executing, and the OS is used to enable presentation of the wagering game.

Thus, the activity at block 339 may comprise downloading the hibernation file to the wagering game machine from a server (or an AOM appliance). The activity at block 339 may further comprise resuming operation of the wagering game machine at a current operational state after authenticating the hibernation file.

In some embodiments, additional authentication may occur. For example, the method 311 may include, at block 343, authenticating at least one of additional hardware or software components associated with presenting the wagering game, after resuming operation at block 339.

The method 311 may continue on to block 347 with verifying that hardware or software configurations of the wagering game machine conform to the desired base operation state. When a configurations does not conform to the desired base operation state, the method 311 may continue on to block 351 with providing an alarm indication and/or conducting additional authentication of hardware and/or software located within the wagering game machine to provide end-to-end authentication of a post-resumption operational configuration of the wagering game machine.

In some embodiments, an operator's configuration menu is displayed after new components are authenticated, perhaps under the assumption or condition that specific access protocols have been fulfilled, such as having the machine access door open and one or more special physical access keys inserted. Thus, when it is determined at block 347 that at least one of the wagering game machine hardware or software configurations conform to the base operation state (e.g., upon determining an access protocol is fulfilled), the method 311 may continue on to block 355 with displaying an operator's console, perhaps in the form of an operator's wagering game machine configuration menu presenting a number of choices corresponding to a number of post-resumption configuration state choices. The method 311 may continue on to block 359 with receiving an indication of one such choice from an operator, via the displayed console.

In some embodiments, the machine may wake up from a first hibernation by accessing a first hibernation file, and responding to a selection input (e.g., from an operator or via automatic selection) received at block 359, continue operating to wake up from a second hibernation by accessing a second hibernation file. Thus, the activity at block 359 may comprise receiving a selection of one of a number of configuration state choices corresponding to at least a second hibernation file.

In some embodiments, the method 311 may continue on to block 361 with conducting additional authentication of hardware and/or software located within the wagering game machine to provide end-to-end authentication of a post-resumption operational configuration corresponding to the selection (made at block 359). In some embodiments, the method 311 may continue on to block 365 with resuming operation of the wagering game machine from a first post-resumption operational configuration to a second post-resumption operational configuration corresponding to the selection (made at block 359).

A backup power supply may be enlisted to continue machine operations when a power interruption or failure occurs, so that a hibernation file can be generated, transmitted, stored, or downloaded before the machine shuts down. A signature for the hibernation file can be generated, to tie the file directly to its specific machine. The signature may thus include some unique aspects of the machine, such as: one or more processor identification numbers, the machine serial number, or any other information, such as a GUID (globally unique identification) number assigned to the machine and/or one or more of its components by the manufacturer. The signature may also include or be associated with the date/time of hibernation file creation, if desired. Thus, the method 311 may comprise, at block 369, sensing a reduction in the operational power provided by the primary power supply, and switching to receive, at the processor, at least a portion of the operational power from a backup power supply (e.g., an uninterruptible power supply (UPS)).

The method 311 may continue on to block 373, with creating a backup hibernation file, and generating a signature for the backup hibernation file. The signature may comprise information that uniquely relates the backup hibernation file to the wagering game machine.

The method 311 may continue on to block 377 with transmitting the backup hibernation file to a server. Further activity at block 377 may comprise removing operational power provided to the processor (to shut down the wagering game machine in a controlled fashion).

The method 311 may continue on to block 381 with sensing restoration of the operational power supply after sensing the reduction in operational power, and then determining existence of the backup hibernation file. Further activity at block 381 may comprise authenticating the backup hibernation file, and resuming operation of the wagering game machine using the backup hibernation file. Still further embodiments may be realized.

For example, the method 311 may include, at block 385, receiving a command to generate a hibernation file associated with a current operational state by a processor within a wagering game machine, and responsively creating the hibernation file within the wagering game machine. The activity at block 385 may further include generating a signature for the hibernation file.

Many commands can be sensed. Such commands might result from, for example, sending the indication provided when a touch screen widget is activated, or sensing the activation of a switch on the wagering game machine, or sensing the automatic execution of snapshot code within the machine. Thus, the command may be associated with activation of one or more of an on-screen menu widget, a hardware switch on the wagering game machine, or the execution of snapshot code within the wagering game machine.

In some embodiments, the command to generate the hibernation file is received from a remote location, such as from a wagering game server or an AOM server. Thus, the command to generate the hibernation file may be transmitted from a remote location. The command may be associated with sensing the occurrence of a progressive game award win. The command may comprise a signal initiated by a hardware or software timer within the wagering game machine. Many other possibilities exist for the generation of a command that can be sensed.

The method 311 may continue on to block 389 to include storing hibernation files, signatures, or both, within the wagering game machine, or elsewhere.

In some embodiments, a hibernation file is received from a remote location. Thus, the method 311 may go on to block 393 to include receiving, by the wagering game machine, one or more hibernation files from a file server. The activity at block 393 may also comprise receiving, by the wagering game machine, one or more hibernation files from another wagering game machine.

Once the machine has access to a hibernation file, whether internally generated or received from an external source, operations can be resumed from a hibernation state. Thus, the method 311 may include, at block 397, accessing the hibernation file to resume operation of the wagering game machine from a hibernation state, to a current operational state.

It is noted that unless specifically claimed otherwise, the methods described herein do not have to be executed in the order described, or in any particular order. Moreover, various activities described with respect to the methods identified herein can be executed in iterative, repetitive, serial, or parallel fashion. Any one activity can be substituted for any other, or inserted between other activities. Information, including parameters, commands, operands, and other data, can be sent and received in the form of one or more carrier waves.

Example Wagering Game Machines

Figure 4:
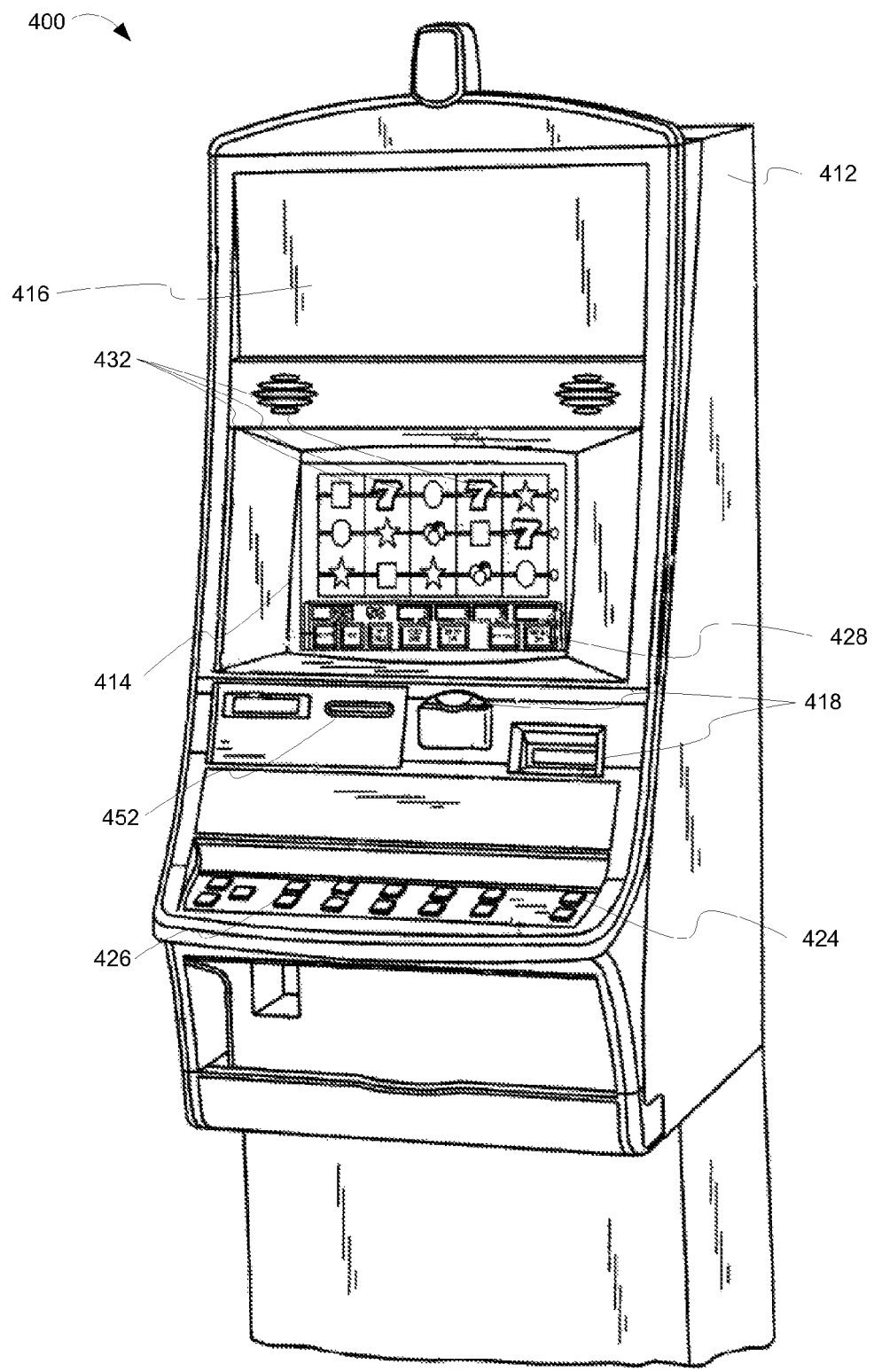
FIG. 4 is a perspective view of a wagering game machine, according to various embodiments.

FIG. 4 is a perspective view of a wagering game machine 400, according to various embodiments of the invention. Referring to FIG. 4, a wagering game machine 400 is used in gaming establishments, such as casinos. According to most embodiments, the wagering game machine 400 can be any type of wagering game machine and can have varying structures and methods of operation. For example, the wagering game machine 400 can be an electromechanical wagering game machine configured to play mechanical slots, or it can be an electronic wagering game machine configured to play video casino games, such as blackjack, slots, keno, poker, blackjack, roulette, etc. The wagering game machine 400 may include one or more of the apparatus 106 of FIG. 1, and may be used in a network in the same way as the machines 202 of FIG. 2.

The wagering game machine 400 comprises a housing 412 and includes input devices, including value input devices 418 and a player input device 424. For output, the wagering game machine 400 includes a primary display 414 for displaying information about a basic wagering game. The primary display 414 can also display information about a bonus wagering game and a progressive wagering game. The wagering game machine 400 also includes a secondary display 416 for displaying wagering game events, wagering game outcomes, and/or signage information. While some components of the wagering game machine 400 are described herein, numerous other elements can exist and can be used in any number or combination to create varying forms of the wagering game machine 400.

The value input devices 418 can take any suitable form and can be located on the front of the housing 412. The value input devices 418 can receive currency and/or credits inserted by a player. The value input devices 418 can include coin acceptors for receiving coin currency and bill acceptors for receiving paper currency. Furthermore, the value input devices 418 can include ticket readers or barcode scanners for reading information stored on vouchers, cards, or other tangible portable storage devices. The vouchers or cards can authorize access to central accounts, which can transfer money to the wagering game machine 400.

The player input device 424 comprises a plurality of push buttons on a button panel 426 for operating the wagering game machine 400. In addition, or alternatively, the player input device 424 can comprise a touch screen 428 mounted over the primary display 414 and/or secondary display 416.

The various components of the wagering game machine 400 can be connected directly to, or contained within, the housing 412. Alternatively, some of the wagering game machine's components can be located outside of the housing 412, while being communicatively coupled with the wagering game machine 400 using any suitable wired or wireless communication technology.

The operation of the basic wagering game can be displayed to the player on the primary display 414. The primary display 414 can also display a bonus game associated with the basic wagering game. The primary display 414 can include a cathode ray tube (CRT), a high resolution liquid crystal display (LCD), a plasma display, light emitting diodes (LEDs), or any other type of display suitable for use in the wagering game machine 400. Alternatively, the primary display 414 can include a number of mechanical reels to display the outcome. In FIG. 4, the wagering game machine 400 is an "upright" version in which the primary display 414 is oriented vertically relative to the player. Alternatively, the wagering game machine can be a "slant-top" version in which the primary display 414 is slanted at about a thirty-degree angle toward the player of the wagering game machine 400. In yet another embodiment, the wagering game machine 400 can exhibit any suitable form factor, such as a free standing model, bar top model, mobile handheld model, or workstation console model.

A player begins playing a basic wagering game by making a wager via the value input device 418. The player can initiate play by using the player input device's buttons or touch screen 428. The basic game can include arranging a plurality of symbols along a payline 432, which indicates one or more outcomes of the basic game. Such outcomes can be randomly selected in response to player input. At least one of the outcomes, which can include any variation or combination of symbols, can trigger a bonus game.

In some embodiments, the wagering game machine 400 can also include an information reader 452, which can include a card reader, ticket reader, bar code scanner, RFID (radio frequency identification) transceiver, or computer readable storage medium interface. In some embodiments, the information reader 452 can be used to award complimentary services, restore game assets, track player habits, etc.

Figure 5:
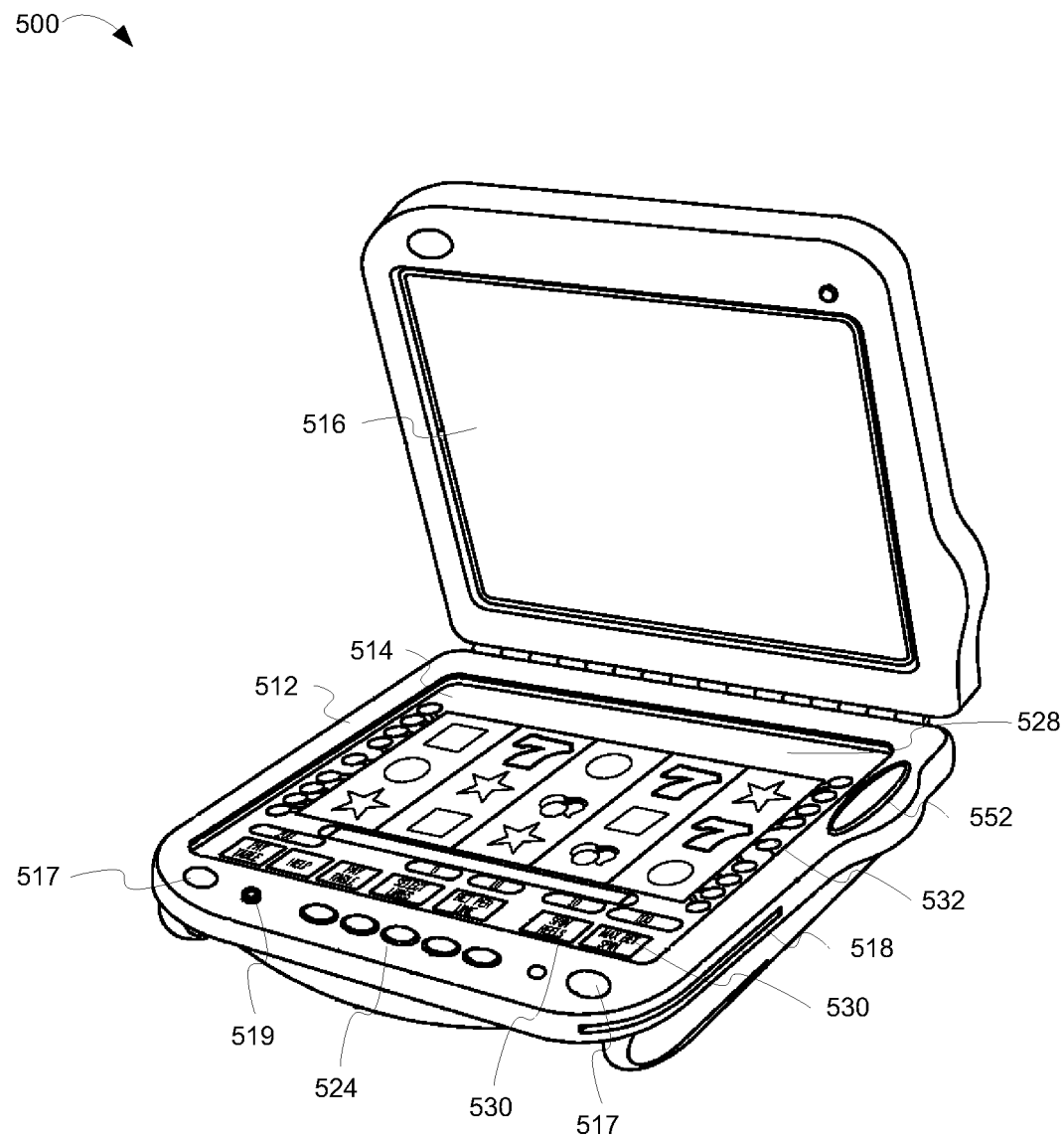
FIG. 5 is a perspective view of a portable wagering game machine, according to various embodiments.

FIG. 5 is a perspective view of a portable wagering game machine 500, according to various embodiments of the invention. Like free standing wagering game machines, in a handheld or mobile form, the wagering game machine 500 can include any suitable electronic device configured to play a video casino games such as blackjack, slots, keno, poker, blackjack, and roulette. The wagering game machine 500 may include one or more of the apparatus 106 of FIG. 1, and may be coupled to a network in the same manner as the machines 202 of FIG. 2.

The wagering game machine 500 comprises a housing 512 and includes input devices, including a value input device 518 and a player input device 524. For output, the wagering game machine 500 includes a primary display 514, a secondary display 516, one or more speakers 517, one or more player-accessible ports 519 (e.g., an audio output jack for headphones, a video headset jack, etc.), and other conventional I/O devices and ports, which may or may not be player-accessible. In the embodiment depicted in FIG. 5, the wagering game machine 500 comprises a secondary display 516 that is rotatable relative to the primary display 514. The optional secondary display 516 can be fixed, movable, and/or detachable/attachable relative to the primary display 514. Either the primary display 514 and/or secondary display 516 can be configured to display any aspect of a non-wagering game, wagering game, secondary game, bonus game, progressive wagering game, group game, shared-experience game or event, game event, game outcome, scrolling information, text messaging, emails, alerts or announcements, broadcast information, subscription information, and wagering game machine status.

The player-accessible value input device 518 can comprise, for example, a slot located on the front, side, or top of the housing 512 configured to receive credit from a stored-value card (e.g., casino card, smart card, debit card, credit card, etc.) inserted by a player. The player-accessible value input device 518 can also comprise a sensor (e.g., an RF sensor) configured to sense a signal (e.g., an RF signal) output by a transmitter (e.g., an RF transmitter) carried by a player. The player-accessible value input device 518 can also or alternatively include a ticket reader, or barcode scanner, for reading information stored on a credit ticket, a card, or other tangible portable credit or funds storage device. The credit ticket or card can also authorize access to a central account, which can transfer money to the wagering game machine 500.

Still other player-accessible value input devices 518 can require the use of touch keys 530 on the touch-screen display (e.g., primary display 514 and/or secondary display 516) or player input devices 524. Upon entry of player identification information and, preferably, secondary authorization information (e.g., a password, PIN number, stored value card number, predefined key sequences, etc.), the player can be permitted to access a player's account. As one potential optional security feature, the wagering game machine 500 can be configured to permit a player to access only accounts the player has specifically set up for the wagering game machine 500. Other security features can also be utilized, for example, to prevent unauthorized access to a player's account, to minimize an impact of any unauthorized access to a player's account, or to prevent unauthorized access to any personal information or funds temporarily stored on the wagering game machine 500.

The player input device 524 comprises a plurality of push buttons on a button panel for operating the wagering game machine 500. In addition, or alternatively, the player input device 524 can comprise a touch screen mounted to a primary display 514 and/or secondary display 516. In one aspect, the touch screen is matched to a display screen having one or more selectable touch keys 530 selectable by a user's touching of the associated area of the screen using a finger or a tool, such as a stylus pointer. A player enables a desired function either by touching the touch screen at an appropriate touch key 530 or by pressing an appropriate push button on the button panel. The touch keys 530 can be used to implement the same functions as push buttons. Alternatively, the push buttons 532, can provide inputs for one aspect of the operating the game, while the touch keys 530 can allow for input needed for another aspect of the game. The various components of the wagering game machine 500 can be connected directly to, or contained within, the housing 512, as seen in FIG. 5, or can be located outside the housing 512 and connected to the housing 512 via a variety of wired (tethered) or wireless connection methods. Thus, the wagering game machine 500 can comprise a single unit or a plurality of interconnected (e.g., wireless connections) parts which can be arranged to suit a player's preferences.

The operation of the basic wagering game on the wagering game machine 500 is displayed to the player on the primary display 514. The primary display 514 can also display the bonus game associated with the basic wagering game. The primary display 514 preferably takes the form of a high resolution LCD, a plasma display, an LED, or any other type of display suitable for use in the wagering game machine 500. The size of the primary display 514 can vary from, for example, about a 2-3" display to a 15" or 17" display. In at least some embodiments, the primary display 514 is a 7"-10" display. In one embodiment, the size of the primary display can be increased. Optionally, coatings or removable films or sheets can be applied to the display to provide desired characteristics (e.g., privacy, anti-scratch, anti-glare, bacterially-resistant and anti-microbial films, etc.). In at least some embodiments, the primary display 514 and/or secondary display 516 can have a 16:9 aspect ratio or other aspect ratio (e.g., 4:3). The primary display 514 and/or secondary display 516 can also each have different resolutions, different color schemes, and different aspect ratios.

As with the free standing embodiments a wagering gaming machine, a player begins play of the basic wagering game on the wagering game machine 500 by making a wager (e.g., via the value input device 518 or an assignment of credits stored on the handheld gaming machine via the touch screen keys 530, player input device 524, or buttons 532) on the wagering game machine 500. In some embodiments, the basic game can comprise a plurality of symbols arranged in an array, and includes at least one payline 528 that indicates one or more outcomes of the basic game. Such outcomes can be randomly selected in response to the wagering input by the player. At least one of the plurality of randomly selected outcomes can be a start-bonus outcome, which can include any variations of symbols or symbol combinations triggering a bonus game.

In some embodiments, the player-accessible value input device 518 of the wagering game machine 500 can double as a player information reader 552 that allows for identification of a player by reading a card with information indicating the player's identity (e.g., reading a player's credit card, player ID card, smart card, etc.). The player information reader 552 can alternatively or also comprise a bar code scanner, RFID transceiver or computer readable storage medium interface. In one embodiment, the player information reader 552 comprises a biometric sensing device. Still further embodiments may be realized.

General

Implementing the apparatus, systems, and methods disclosed herein may operate to significantly increase recovery time for wagering game machines that undergo power-off, power-on cycle operations. Player satisfaction may be increased, and additional revenue for owners of the machines may result.

In this detailed description, reference is made to specific examples by way of drawings and illustrations. These examples are described in sufficient detail to enable those skilled in the art to practice the inventive subject matter, and serve to illustrate how the inventive subject matter can be applied to various purposes or embodiments. Other embodiments are included within the inventive subject matter, as logical, mechanical, electrical, and other changes can be made to the example embodiments described herein. Features or limitations of various embodiments described herein, however essential to the example embodiments in which they are incorporated, do not limit the inventive subject matter as a whole, and any reference to the invention, its elements, operation, and application are not limiting as a whole, but serve only to define these example embodiments.

Such embodiments of the inventive subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Description of the Embodiments, it can be seen that various features are grouped together in a single embodiment for the purpose of streamlining the disclosure. This method of disclosure is not to be interpreted to require more features than are expressly recited in each claim. Rather, inventive subject matter may be found in less than all features of a single disclosed embodiment. Thus the following claims are hereby incorporated into this detailed description, with each claim standing on its own as a separate embodiment.

We claim:

1. A method of operating a wagering game machine primarily dedicated to playing a casino-style wagering game, the wagering game machine including a housing, one or more processors, an electronic display device, and an electronic input device, the electronic display device and the electronic input device being coupled to the housing, the method comprising:
   receiving operational power from a primary power supply at at least one of the one or more processors housed within the wagering game machine, at least one of the one or more processors operable to present the wagering game;
   determining, by at least one of the one or more processors, that the wagering game machine is currently in a hibernation state;
   authenticating, by at least one of the one or more processors, at least one hibernation file using a verified signature particularly associated with the at least one hibernation file; and
   in response to authenticating the at least one hibernation file, resuming, by at least one of the one or more processors, operation of the wagering game machine to a base operation state defined by the at least one hibernation file.

2. The method of claim 1, wherein the determining comprises detecting existence, by at least one of the one or more processors, of the at least one hibernation file stored in the wagering game machine.

3. The method of claim 1, further comprising:
   after the resuming, verifying that at least one of hardware or software configurations for the wagering game machine conforms to the base operation state; and
   in response to one of the configurations not conforming to the base operation state, providing end-to-end authentication of a post-resumption operational configuration of the wagering game machine by providing an alarm indication or conducting additional authentication of hardware or software located within the wagering game machine.

4. The method of claim 1, further comprising:
   after the resuming, authenticating at least one of additional hardware or software components associated with presenting the wagering game.

5. The method of claim 4, further comprising:
   displaying an operator's wagering game machine configuration menu upon determining an access protocol is fulfilled.

6. The method of claim 1, wherein the base operation state comprises a state wherein a basic input-output system (BIOS) is loaded, but not yet executing, the BIOS to enable loading of an operating system.

7. The method of claim 1, wherein the base operation state comprises a state wherein an operating system is loaded, but not yet executing, the operating system to enable presentation of the wagering game.

8. The method of claim 1, further comprising:
   receiving, by the wagering game machine, the at least one hibernation file from a file server.

9. The method of claim 1, further comprising:
   receiving, by the wagering game machine, the at least one hibernation file from another wagering game machine.

10. A method of operating a wagering game machine primarily dedicated to playing a casino-style wagering game, the wagering game machine including a housing, one or more processors, an electronic display device, and an electronic input device, the electronic display device and the electronic input device being coupled to the housing, the method comprising:
    receiving operational power from a primary power supply at at least one of the one or more processors housed within a wagering game machine, at least one of the one or more processors operable to present the wagering game;
    determining, by at least one of the one or more processors, that the wagering game machine is currently in a hibernation state;
    authenticating, by at least one of the one or more processors, at least a first hibernation file using a verified signature particularly associated with the at least a first hibernation file; and
    in response to authenticating the at least a first hibernation file, resuming, by at least one of the one or more processors, operation of the wagering game machine to a base operation state defined by the at least a first hibernation file, the base operation state comprising presentation of an operator's wagering game machine configuration menu.

11. The method of claim 10, further comprising:
    receiving a selection of one of a number of post-resumption configuration state choices; and
    providing end-to-end authentication of a post-resumption operational configuration of the wagering game machine by conducting additional authentication of hardware or software located within the wagering game machine corresponding to the selection.

12. The method of claim 10, further comprising:
receiving a selection of one of a number of configuration state choices corresponding to at least a second hibernation file; and
resuming operation of the wagering game machine from a first post-resumption operational configuration to a second post-resumption operational configuration corresponding to the selection.

13. A method of operating a wagering game machine primarily dedicated to playing a casino-style wagering game, the wagering game machine including a housing, one or more processors, an electronic display device, and an electronic input device, the electronic display device and the electronic input device being coupled to the housing, the method comprising:
receiving operational power from a primary power supply at at least one of the one or more processors housed within the wagering game machine, at least one of the one or more processors operable to present a wagering game;
determining, by at least one of the one or more processors, that the wagering game machine is currently in a hibernation state;
authenticating, by at least one of the one or more processors, at least one hibernation file using a verified signature particularly associated with the at least one hibernation file; and
in response to authenticating the at least one hibernation file, resuming, by at least one of the one or more processors, operation of the wagering game machine to a base operation state defined by the at least one hibernation file, the base operation state comprising presentation of the wagering game.

14. The method of claim 13, wherein the at least one hibernation file corresponds to one of multiple selectable base operation state configurations of the wagering game machine, further comprising:
receiving an indication that a particular one of the selectable base operation state configurations is to be selected for resuming the operation of the wagering gaming machine, the indication based on a hardware configuration of the wagering game machine.

15. The method of claim 13, wherein the at least one hibernation file corresponds to one of multiple selectable loaded gaming application configurations of the wagering game machine, further comprising:
receiving an indication that a particular one of the selectable loaded gaming application configurations is to be selected for resuming the operation of the wagering gaming machine.

16. The method of claim 13, further comprising:
sensing a reduction in the operational power provided by the primary power supply;
switching to receive, at at least one of the one or more processors, at least a portion of the operational power from a backup power supply;
creating, by at least one of the one or more processors, a backup hibernation file; and
generating, by at least one of the one or more processors, a backup file signature for the backup hibernation file.

17. The method of claim 16, wherein the backup file signature comprises information that uniquely relates the backup hibernation file to the wagering game machine.

18. The method of claim 16, further comprising:
sensing, by at least one of the one or more processors, restoration of the operational power after sensing the reduction;
determining, by at least one of the one or more processors, existence of the backup hibernation file;
authenticating, by at least one of the one or more processors, the backup hibernation file using the backup file signature; and
in response to authenticating the at least one hibernation file, resuming, by at least one of the one or more processors, operation of the wagering game machine using to an operational state defined by the backup hibernation file.

19. The method of claim 16, further comprising:
transmitting the backup hibernation file to a server; and
removing the portion of the operational power provided to at least one of the one or more processors.

20. A method of operating a wagering game machine primarily dedicated to playing a casino-style wagering game, the wagering game machine including a housing, one or more processors, an electronic display device, and an electronic input device, the electronic display device and the electronic input device being coupled to the housing, the method comprising:
receiving a command to generate a hibernation file defining a current operational state by at least one of the one or more processors within the wagering game machine;
creating, by at least one of the one or more processors, the hibernation file within the wagering game machine;
generating, by at least one of the one or more processors, a verified signature for the hibernation file; and
storing at least one of the hibernation file or the signature within the wagering game machine, the hibernation file to be used in resuming operation of the wagering game machine from in a hibernation state to the current operational state in response to authenticating the hibernation file using the signature.

21. The method of claim 20, wherein the command is associated with activating one of an on-screen menu widget or a hardware switch on the wagering game machine, or executing snapshot code within the wagering game machine.

22. The method of claim 20, wherein the command to generate the hibernation file is transmitted from a remote location.

23. The method of claim 20, wherein the command is associated with a progressive game award win.

24. The method of claim 20, wherein the command comprises a signal initiated by a hardware or a software timer within the wagering game machine.

25. The method of claim 20, further comprising:
downloading the hibernation file to the wagering game machine from a server; and resuming operation of the wagering game machine at the current operational state after authenticating the hibernation file using the signature.

26. A wagering game machine primarily dedicated to playing a casino-style wagering game, comprising:
a housing for housing components associated with the casino-style wagering game;
a value input device disposed on the housing and used to fund the casino-style wagering game;
one or more processors operable to present the casino-style wagering game upon which monetary value may be wagered;
a non-volatile memory storing instructions; and
a power supply to provide operational power, wherein at least one of the one or more processors operates, upon receiving the operational power, to execute the instructions to determine that when the wagering game machine is in a hibernation state, operation of the wagering game machine is to resume at a base operation state defined by at least one hibernation file when authentication of the at least one hibernation file is successful using a verified signature particularly associated with the at least one hibernation file.

27. The machine of claim 26, further comprising:
a circuit to receive a command to initiate creation of the at least one hibernation file by the wagering game machine.

28. The machine of claim 27, wherein the command is received in response to activation of a hardware switch, the value input device, a player input device, a touch screen display device, or an information reader.

29. The machine of claim 27, wherein the circuit comprises a network interface to receive the command from a server.

30. The machine of claim 26, further comprising:
a display device to display an operator's wagering game configuration menu in the base operation state.

* * * * *